United States Patent
Lee et al.

(10) Patent No.: US 8,250,466 B2
(45) Date of Patent: Aug. 21, 2012

(54) COMPUTER AND METHOD FOR CONVERTING A WEB PAGE

(75) Inventors: Chung-I Lee, Taipei Hsien (TW); Chien-Fa Yeh, Taipei Hsien (TW); Da-Peng Li, Shenzhen (CN); Zhi-Hong Li, Shenzhen (CN)

(73) Assignees: Hong Fu Jin Precision Industry (ShenZhen) Co., Ltd., Shenzhen City, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 383 days.

(21) Appl. No.: 12/580,355

(22) Filed: Oct. 16, 2009

(65) Prior Publication Data

US 2010/0169761 A1    Jul. 1, 2010

(30) Foreign Application Priority Data

Dec. 27, 2008    (CN) .......................... 2008 1 0306600

(51) Int. Cl.
*G06F 17/00*    (2006.01)
*G06F 15/16*    (2006.01)

(52) U.S. Cl. ........ 715/234; 715/205; 715/249; 715/273; 715/733; 709/203; 709/219

(58) Field of Classification Search .......... 715/200–202, 715/204, 205, 208–210, 226, 227, 229, 231, 715/234, 239, 243, 255, 256, 273, 274, 700, 715/733, 737, 738, 744, 760, 762, 764; 709/201–234
See application file for complete search history.

(56) References Cited

U.S. PATENT DOCUMENTS

| 7,406,498 | B2* | 7/2008 | Reshef et al. ................. 709/203 |
| 7,702,814 | B2* | 4/2010 | Lee et al. ...................... 709/246 |
| 7,895,525 | B2* | 2/2011 | Rees et al. .................... 715/760 |
| 8,041,732 | B2* | 10/2011 | Lee et al. ...................... 707/769 |
| 2002/0169891 | A1 | 11/2002 | Sasaki et al. |
| 2004/0095400 | A1* | 5/2004 | Anderson et al. ............. 345/864 |
| 2009/0157633 | A1* | 6/2009 | Lee et al. .......................... 707/3 |

FOREIGN PATENT DOCUMENTS

CN    101178717 A    5/2008

* cited by examiner

*Primary Examiner* — Maikhanh Nguyen
(74) *Attorney, Agent, or Firm* — Altis Law Group, Inc.

(57) ABSTRACT

A method for converting a web page sets local URLs to correspond to effective URLs of web pages, saves the local URLs and the effective URL of the web pages in the storage. The method further searches the storage for an effective URL corresponding to a local URL inputted by a user, accesses the web page in a web server according to the effective URL. The method also obtains byte streams of content in the web page, converts the image byte streams into images, converts the character byte streams into characters, and generates a local web page comprising the images and the characters.

10 Claims, 3 Drawing Sheets

COMPUTER AND METHOD FOR CONVERTING A WEB PAGE

BACKGROUND

1. Technical Field

Embodiments of the present disclosure relate to web page management, and particularly to a computer and method for converting a web page.

2. Description of Related Art

By the advent of the Internet, enormous amounts of information have become easily accessible. If a computer is connected to the Internet, users are able to use the computer to browse web pages to obtain information. However, for security reasons, a lot of companies limit web page access of their employees.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
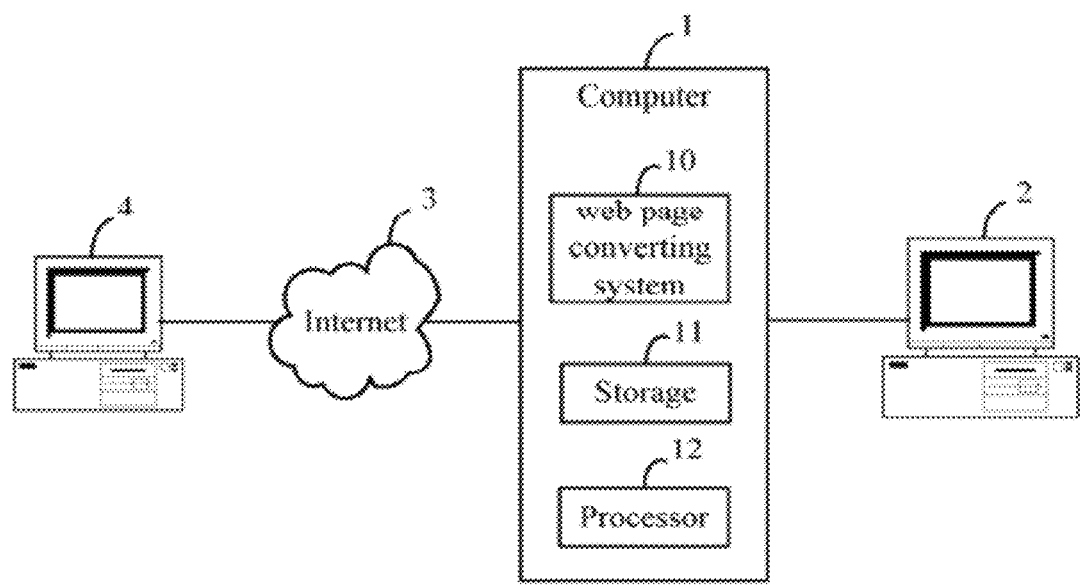
FIG. 1 is a block diagram of one embodiment of a computer including a web page converting system.

FIG. 1 is a block diagram of one embodiment of a computer 1 including a web page converting system 10. The web page converting system 10 is used to access a web page in a web server 4 via the Internet 3, and convert the web page into a local web page for users to view via the local server 2.

The computer 1 is electronically connected to a local server 2 and electronically connected to the web server 4 via the Internet 3. The local server 2 and the web server 4 may be a host computer, for example.

The computer 1 also includes a storage 11, a processor 12, and a display 13. The processor 12 executes one or more computerized operations of the computer 1 and other applications, to provide the functions of the computer 1. The storage 11 stores one or more programs, such as programs of an operating system, other applications of the computer 1, and various kinds of data, such as a uniform resource locator (URL) of a web page, for example. In one embodiment, the storage 11 may be a memory of the computer 1 (e.g., a hard disk) or an external storage card, such as a flash card, for example. The display 13 may display or output visible data, such as the web page, for example.

Figure 2:
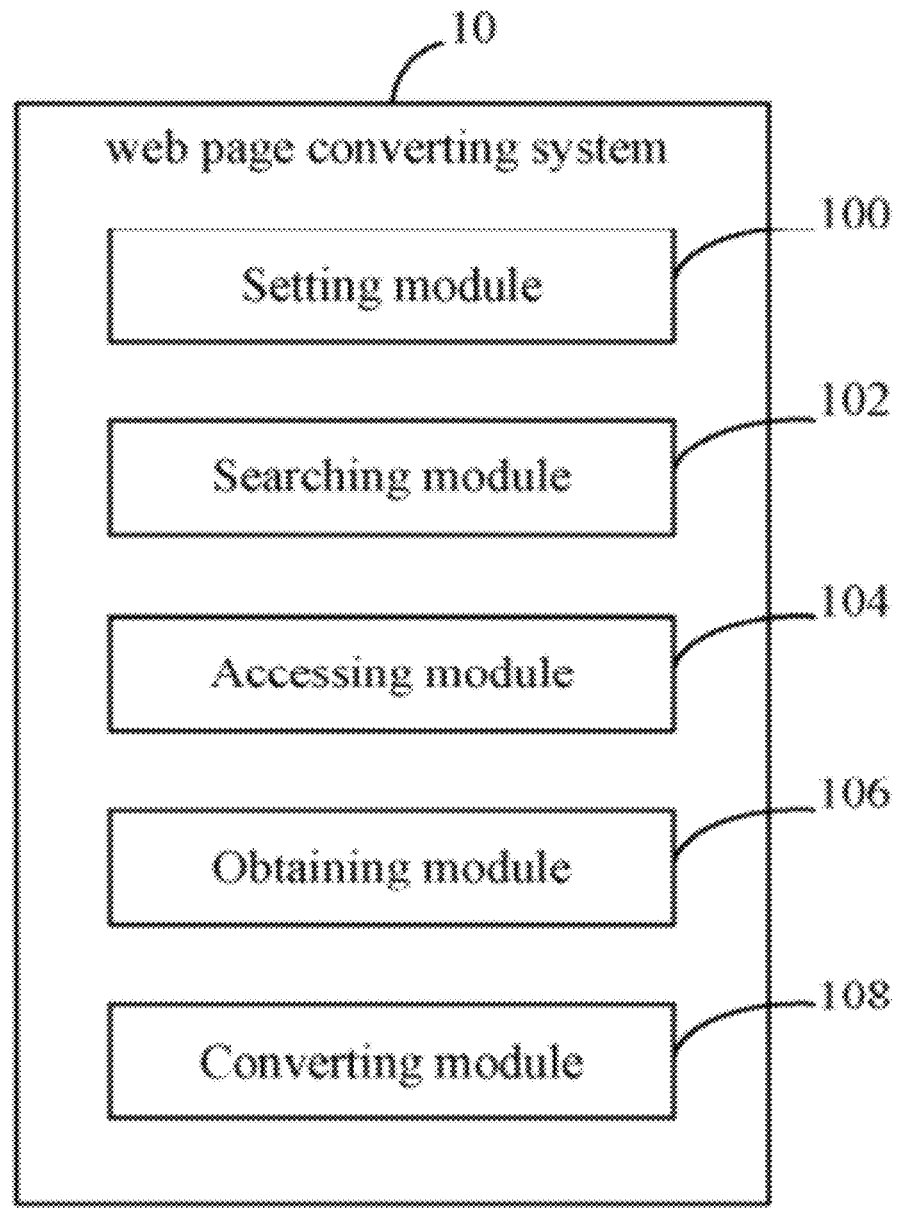
FIG. 2 is a block diagram of one embodiment of the web page converting system of FIG. 1.

FIG. 2 is a block diagram of one embodiment of the web page converting system 10 in FIG. 1. In one embodiment, the web page converting system 10 includes a setting module 100, a searching module 102, an accessing module 104, an obtaining module 106, a converting module 108, and a displaying module 110. The modules 100, 102, 104, 106, 108, and 110 may comprise one or more computerized operations to be executed by the processor 12 to perform one or more operations of the computer 1. Details of these operations will be provided below.

The setting module 100 sets local URLs to correspond to effective URLs of web pages accessed though the web server via the Internet 3, saves the local URLs and the effective URLs of the web pages in the storage 11. In one embodiment, each of the local URLs corresponds to an effective URL of each of the web pages. The effective URL is a physical address in the web server 4, such as "http://xxx.sina.com," for example. The local URL is a virtual address in the local server 2. The virtual address corresponds to the physical address, such as, "http://localhost/hrs/sample" corresponds to the physical address of "http://xxx.sina.com," for example.

The searching module 102 searches the storage 11 for an effective URL corresponding to a local URL input by a user. For example, if a local URL input by the user is "http://localhost/hrs/sample," a corresponding effective URL of the local URL stored in the computer 1 is http://xxx.sina.com. In one example, the user may input the local URL via a keyboard or a touch screen of the computer 1, for example.

The accessing module 104 accesses the web page in the web server 4 according to the effective URL via the Internet 3. In one embodiment, if the effective URL is "http://xxx.sina.com," the accessing module 104 accesses a web page of the "http://xxx.sina.com" via the Internet 3.

The obtaining module 106 obtains byte streams of content in the accessed web page. The byte streams may include image byte streams and character byte streams. In one embodiment, the byte streams may be binary data. The image byte streams are used to display images of the accessed web page, and the character byte streams are used to display characters of the accessed web page.

In one embodiment, the converting module 108 converts the image byte streams into images, and convert the character byte streams into characters.

In another embodiment, the characters may be linked to one or more URLs. The linked URLs may be relative URLs or absolute URLs, for example. The absolute URL includes a protocol, such as "http," a network location, an optional path, or a file name. For example, a URL "http://xxx.sina.com/mil?id=123456" is an absolute URL; while a relative URL is a compact representation of the location of a resource relative to the absolute URL, for example, a URL "/mil?id=123456" is a relative URL.

The converting module 106 may further extract the linked URLs of the characters, and convert the linked URLs of the characters to local absolute URLs. In one embodiment, the local URL is "http://localhost/hrs/sample," the effective URL is "http://xxx.sina.com," the linked URL in the characters is "/mil?id=123456." First, the converting module 106 converts the relative linked URL "/mil?id=123456" to an absolute URL "http://xxx.sina.com/mil?id=123456." Then, the converting module 106 converts the absolute URL "http://xxx.sina.com/mil?id=123456" to the local absolute URL "http://localhost/hrs/sample?q=http://xxx.sina.com/mil?id=123456."

The converting module 108 may also generate a local web page including the images and the characters including the local absolute URLs for the user to view via the local server 2. The local web page is being displayed on the local server 2. Thus, though the local server 2 is not connected to the Internet for security reasons, the user of the local server 2 can view web page from the computer 1.

Figure 3:
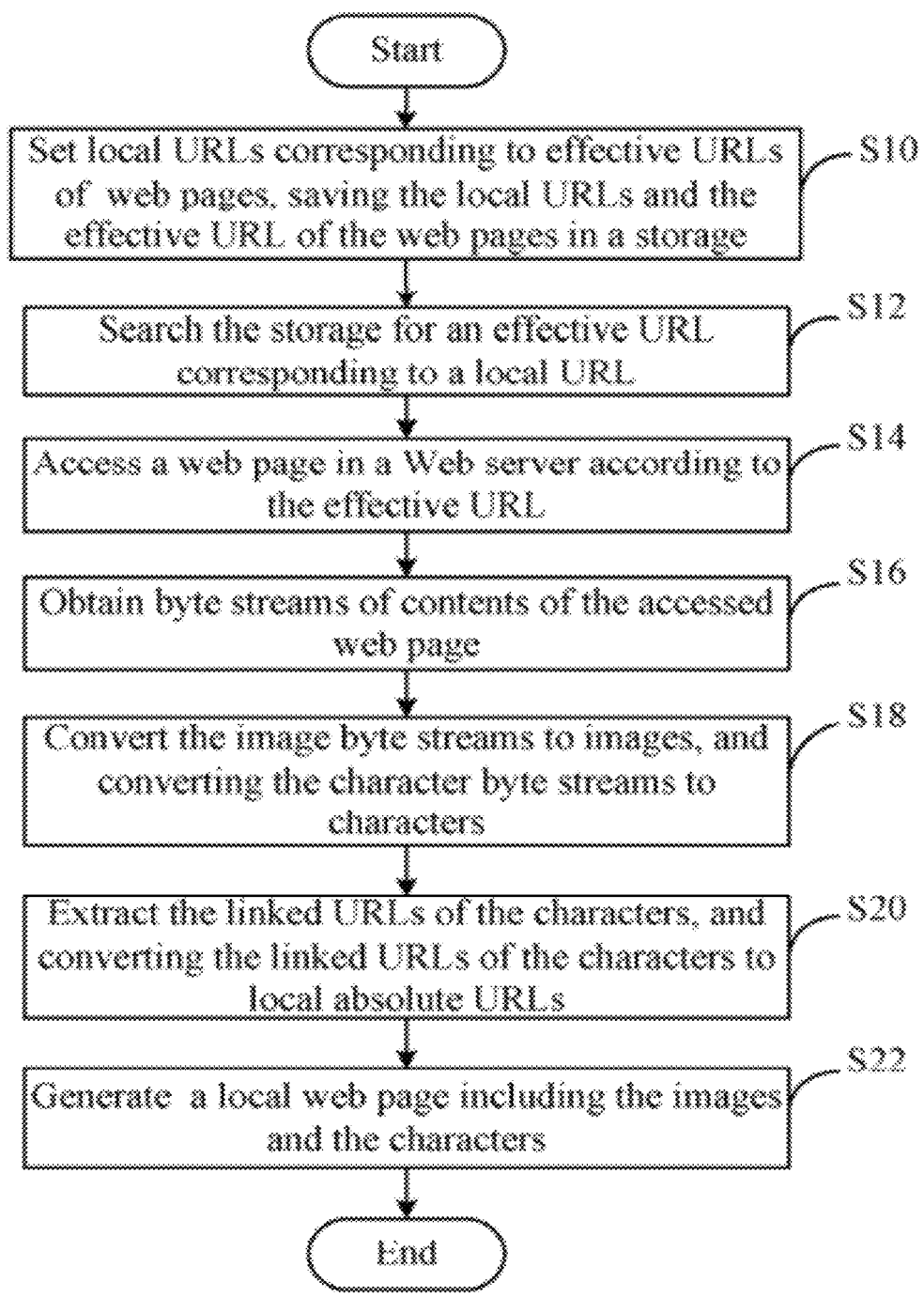
FIG. 3 illustrates a flowchart of one embodiment of a method for converting a web page.

FIG. 3 illustrates a flowchart of one embodiment of a method for converting a web page. Depending on the embodiment, additional blocks may be added, others removed, and the ordering of the blocks may be changed.

In block S10, the setting module 100 sets local URLs to correspond to effective URLs of web pages accessed though the web server via the Internet 3, saves the local URLs and the effective URLs of the web pages in the storage 11. Each of the local URLs corresponds to an effective URL of each of the web pages. The effective URL is a physical address in the web server 4, such as "http://www.flashempire.com," for example. The local URL is a virtual address in the local server 2. The virtual address corresponds to the physical address, such as, "http://localhost/hrs/sample" corresponds to the physical address of "http://www.flashempire.com," for example.

In block S12, the searching module 102 searches the storage 11 for an effective URL corresponding to a local URL input by a user. For example, if a local URL input by the user is "http://localhost/hrs/sample," a corresponding effective URL of the local URL stored in the computer 1 is "http://www.flashempire.com."

In block S14, the accessing module 104 accesses the web page in the web server 4 according to the effective URL via the Internet 3. If the effective URL is "http://www.flashempire.com," the accessing module 104 accesses a web page of the "http://www.flashempire.com" via the Internet 3.

In block S16, the obtaining module 106 obtains byte streams of content in the accessed web page. The byte streams may include image byte streams and character byte streams. In one embodiment, the byte streams are binary data. The image byte streams are used to display images of the accessed web page, and the character byte streams are used to display characters of the accessed web page.

In block S18, the converting module 108 converts the image byte streams into images, and convert the character byte streams into characters. The characters may be linked to one or more URLs. The linked URLs may be relative URLs or absolute URLs, for example. The absolute URL includes a protocol, such as "http," a network location, an optional path, or a file name. For example, a URL "http://www.flashempire.com/flash/swfl/1089246822_zhenzj.swf" is an absolute URL; while a relative URL is a compact representation of the location of a resource relative to the absolute URL, for example, a URL "lash/swfl/1089246822_zhenzj.swf" is a relative URL.

In block S20, the converting module 106 extracts the linked URLs of the characters, and convert the linked URLs of the characters to local absolute URLs. For example, if the local URL is "http://localhost/hrs/sample," the effective URL is "http://www.flashempire.com," the linked URL in the characters is "lash/swfl/1089246822_zhenzj.swf." First, the converting module 106 converts the relative linked URL "lash/swfl/1089246822_zhenzj.swf" to an absolute URL "http://www.flashempire.com/flash/swfl/1089246822_zhenzj.swf." Then, the converting module 106 converts the absolute URL "http://www.flashempire.com/flash/swfl/1089246822_zhenzj.swf http://xxx.sina.com/mil?id=123456" to the local absolute URL "http://localhost/hrs/sample?q=http://www.flashempire.com/flash/swfl/1089246822_zhenzj.swf."

In block S22, the converting module 108 generates a local web page including the images and the characters including the local absolute URLs for the user to view via the local server 2. The local web page is being displayed on the local server 2. Thus, though the local server 2 is not connected to the Internet for security reasons, the user of the local server 2 can view web page from the computer 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer for converting a web page, the computer being electronically connected to a local server and electronically connected to a web server via the Internet, the computer comprising:
    a storage;
    at least one processor; and
    one or more programs stored in the storage and being executable by the at least one processor, the one or more programs comprising:
    a setting module that sets local uniform resource locators (URLs) to correspond to effective URLs of web pages accessed though the web server via the Internet, and saves the local URLs and the effective URL of the web pages in the storage, each of the local URLs corresponding to an effective URL of each of the web pages, the local URL being a virtual address of the effective URL in the local server;
    a searching module that searches the storage for an effective URL corresponding to a local URL input by a user;
    an accessing module that accesses the web page in the web server according to the effective URL;
    an obtaining module that obtains byte streams of content in the web pages, the byte streams comprising image byte streams and character byte streams; and
    a converting module that converts the image byte streams into images, converts the character byte streams into characters that are linked to one or more URLs, extracts the linked URLs of the characters, converts the linked URLs of the characters to local absolute URLs, and generates a local web page comprising the images and the characters comprising the local absolute URLs, the local web page being displayed on the local server.

2. The computer as claimed in claim 1, wherein the effective URL is a physical address in the web server.

3. The computer as claimed in claim 1, wherein the linked URLs of the characters comprise relative URLs and absolute URLs.

4. A computer-implemented method for converting a web page, the method comprising:
    setting local uniform resource locators (URLs) to correspond to effective URLs of web pages accessed though the web server via the Internet, save the local URLs and the effective URL of the web pages in the storage, each of the local URLs corresponding to an effective URL of each of the web pages, the local URL being a virtual address of the effective URL in the local server;
    searching the storage for an effective URL to correspond to a local URL input by a user;
    accessing the web page in the web server according to the effective URL;
    obtaining byte streams of content in the web page, the byte streams comprising image byte streams and character byte streams; and
    converting the image byte streams into images, converting the character byte streams into characters that are linked to one or more URLs, extracting the linked URLs of the characters, converting the linked URLs of the characters to local absolute URLs, and generating a local web page comprising the images and the characters comprising the local absolute URLs, the local web page being displayed on the local server.

5. The method of claim 4, wherein the effective URL is a physical address in the web server.

6. The method of claim 4, wherein the linked URLs of the characters comprise relative URLs and absolute URLs.

7. A non-transitory computer-readable medium having stored thereon instructions that, when executed by a computerized device, cause the computerized device to execute a computer-implemented method for converting a web page, the method comprising:
- setting local uniform resource locators (URLs) to correspond to effective URLs of web pages accessed though the web server via the Internet, save the local URLs and the effective URL of the web pages in the storage, each of the local URLs corresponding to an effective URL of each of the web pages, the local URL being a virtual address of the effective URL in the local server;
- searching the storage for an effective URL corresponding to a local URL input by a user;
- accessing the web page in the web server according to the effective URL;
- obtaining byte streams of content in the web page, the byte streams comprising image byte streams and character byte streams; and
- converting the image byte streams into images, converting the character byte streams into characters that are linked to one or more URLs, extracting the linked URLs of the characters, converting the linked URLs of the characters to local absolute URLs, and generating a local web page comprising the images and the characters comprising the local absolute URLs, the local web page being displayed on the local server.

8. The medium of claim 7, wherein the effective URL is a physical address in the web server.

9. The medium of claim 7, wherein the linked URLs of the characters comprise relative URLs and absolute URLs.

10. The medium of claim 9, wherein the linked URLs of the characters are converted to local absolute URLs.

* * * * *